J. R. GAMMETER.
METHOD OF MAKING PACKING.
APPLICATION FILED NOV. 8, 1916.
1,251,009.
Patented Dec. 25, 1917.
2 SHEETS—SHEET 1.
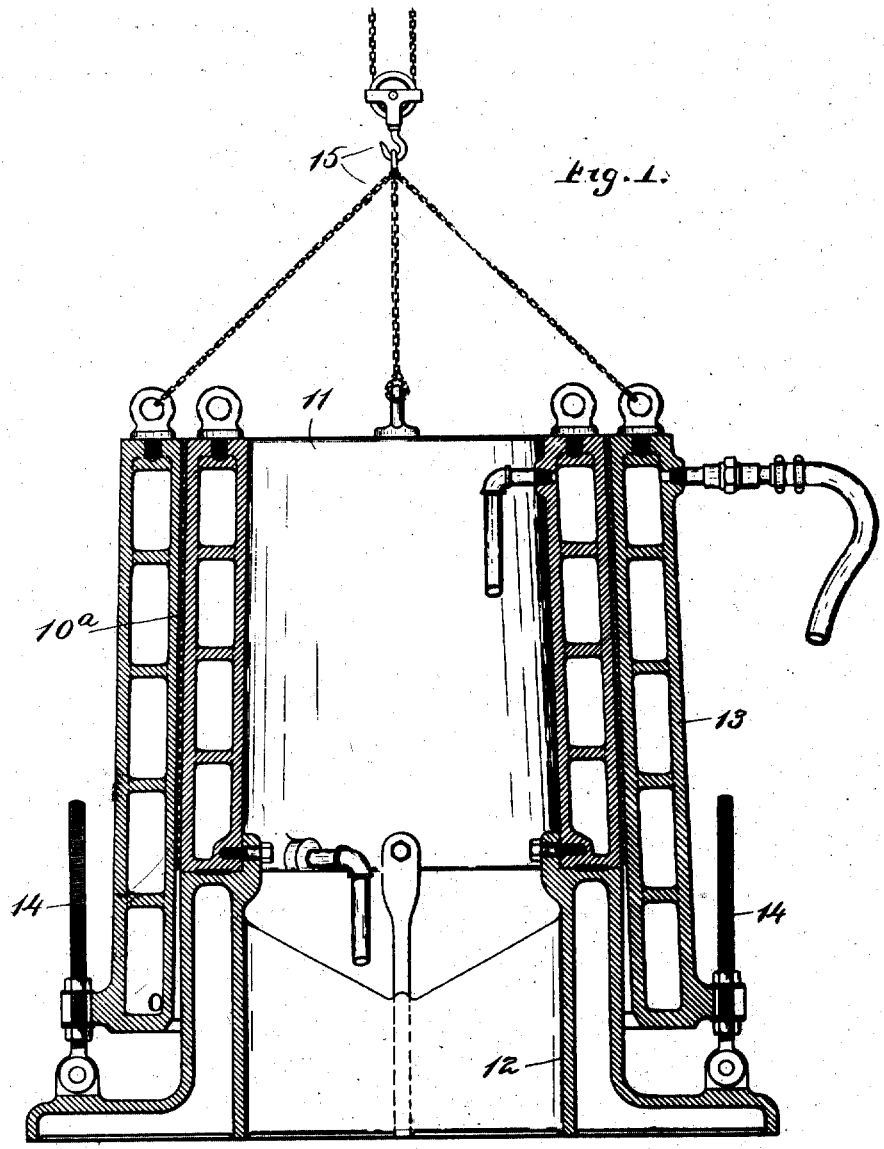
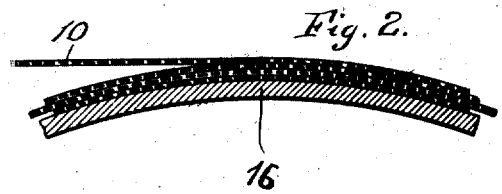
INVENTOR.
J. R. Gammeter
BY Robert M. Pierson
ATTORNEY.

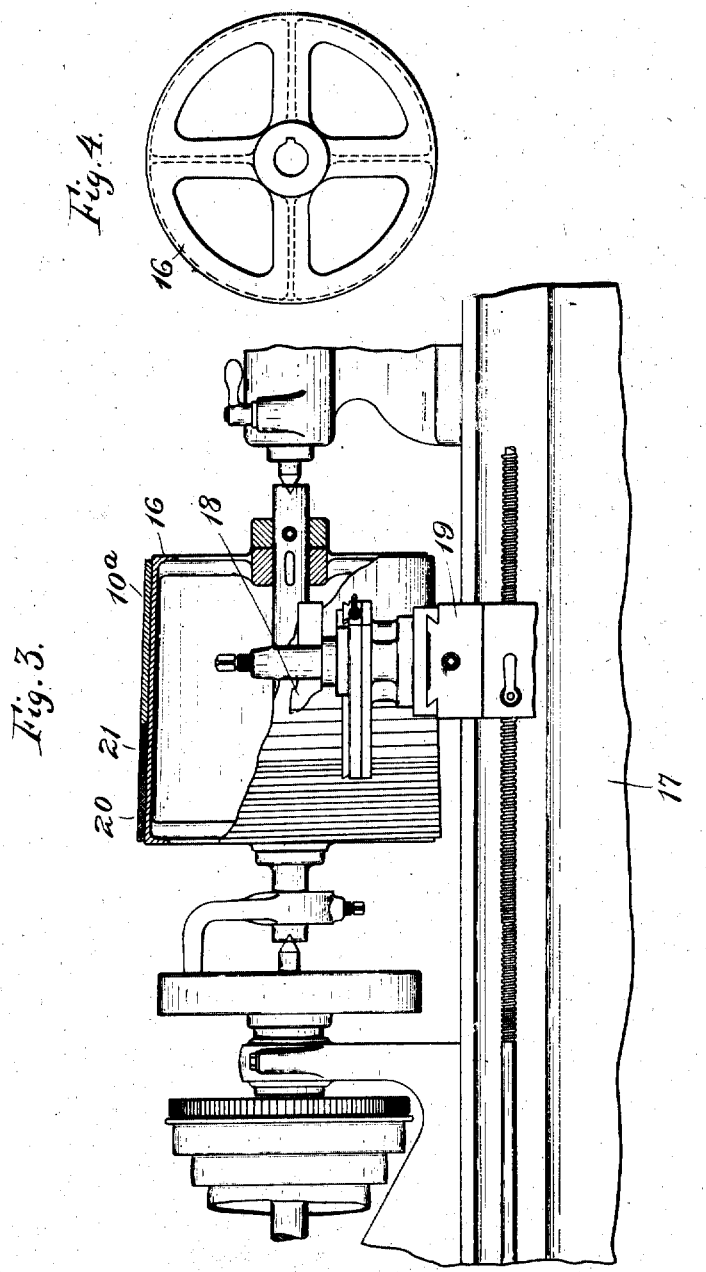

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

METHOD OF MAKING PACKING.

1,251,009.   Specification of Letters Patent.   Patented Dec. 25, 1917.

Application filed November 8, 1916. Serial No. 130,162.

*To all whom it may concern:*

Be it known that I, JOHN R. GAMMETER, a citizen of the United States, residing at Akron, in the county of Summit and State of Ohio, have invented certain new and useful Improvements in Methods of Making Packing, of which the following is a specification.

This invention relates to the manufacture of packing, and especially laminated machinery packing in long lengths from sheets of rubberized fabric or other suitable packing material. The method heretofore pursued has been to build up and cure a flat laminated slab and then cut it into strips or sections of rectangular or other desired cross-sectional form. The object of my invention is to save time and labor by substituting the hollow conical or other tubular form for the flat form and thus enable the packing to be more readily built up from the sheets, conveniently vulcanized and more quickly and easily cut into strip form.

Of the accompanying drawings,

Figure 1 is a vertical section showing a suitable form of vulcanizing press and a laminated cone of packing material therein.

Fig. 2 is a fragmental cross-section showing the mode of building up the cone of packing material.

Fig. 3 is a side elevation of a portion of a lathe with a cone of packing material supported therein and subjected to the cutting operation.

Fig. 4 is an end view of the cone-supporting drum.

The sheets 10 of rubberized fabric, or alternate sheets of rubber and fabric, or plain rubber or other suitable packing material are first wound to the desired thickness or number of layers upon a circular support as represented in Fig. 2, the said support having a slight tapering or conical form. The winding or wrapping may be done upon the drum 16 shown in Figs. 3 and 4, and the hollow conical or tubular body of material then slipped off of the forming drum and placed upon the inner or male member of the press represented in Fig. 1. This press is preferably steam-jacketed and the heat serves to vulcanize the rubber in the case of rubber packings, or to set the binding material in the case of other packings such as asbestos treated with a plastic binder, and it also serves to consolidate the cone of packing material. Soapstone or other lubricant is applied to one or both sides of the cone and in cases of extremely tacky material a sheet-metal conical shield (not shown) might be employed to prevent direct contact between the packing material and either member of the press.

The vulcanizing or curing press as shown comprises an inner steam-jacketed cone 11 mounted upon a base or support 12, and a mating outer steam-jacketed cone 13 held to the base 12 by means of pivoted bolts 14 and adapted to be raised and lowered by suitable chain hoisting tackle 15. The laminated cone $10^a$ of packing material is represented in position to be vulcanized between the two press members. After vulcanization is complete, the outer press member 13 is lifted out of the way and the cone of packing material is lifted off of the inner press member 11 and placed upon the conical drum or mandrel 16. Said drum is then mounted between centers in a lathe 17 provided with a suitable cutting tool 18 whose carriage 19 has the usual automatic longitudinal feed, and straight and diagonal cross-feeds. Preferably the tail-stock is offset toward the cutting side so as to bring the longitudinal feed parallel to an element of the cone on that side. By properly adjusting the tool and rotating the drum 16, the laminated cone $10^a$ of packing material is cut into a continuous spiral strip of packing whose section may be either rectangular as shown at 20 in Fig. 3, or triangular as shown at 21, or of other suitable shape.

I claim:

1. The method of making packing which consists in forming a hollow conical body of packing material and cutting a strip of packing circumferentially therefrom.

2. The method of making packing which consists in forming a hollow cone of packing material, and cutting the same spirally into a continuous strip of packing.

3. The method of making laminated packing which consists in wrapping sheets of packing material upon a conical support to form a hollow conical body, and cutting said body circumferentially into strip form.

4. The method of making packing which consists in forming a tube of plastic packing material, pressing and curing said tube in conical form, and cutting the cured tube spirally into a continuous strip or strips of packing.

5. The method of making laminated packing which consists in winding sheets of fabric and rubber into the form of a tube, vulcanizing said tube, and cutting a strip of packing spirally therefrom.

6. The method of making laminated rubber packing which consists in building up a hollow cone of packing material with layers of rubber and fabric, vulcanizing the same, and cutting it circumferentially into packing of the desired width.

7. The method of making laminated rubber packing which consists in winding sheets of rubber and fabric upon a conical support to form a hollow laminated cone of packing material, vulcanizing said cone, and cutting it spirally into packing of the desired width and cross-sectional shape.

In testimony whereof I have hereunto set my hand this 28 day of October, 1916.

JOHN R. GAMMETER.